Aug. 7, 1945.   C. H. CLARE   2,381,335
CHUCK FOR DRILLS, REAMERS, MILLING CUTTERS AND LIKE TOOLS
Filed May 19, 1943
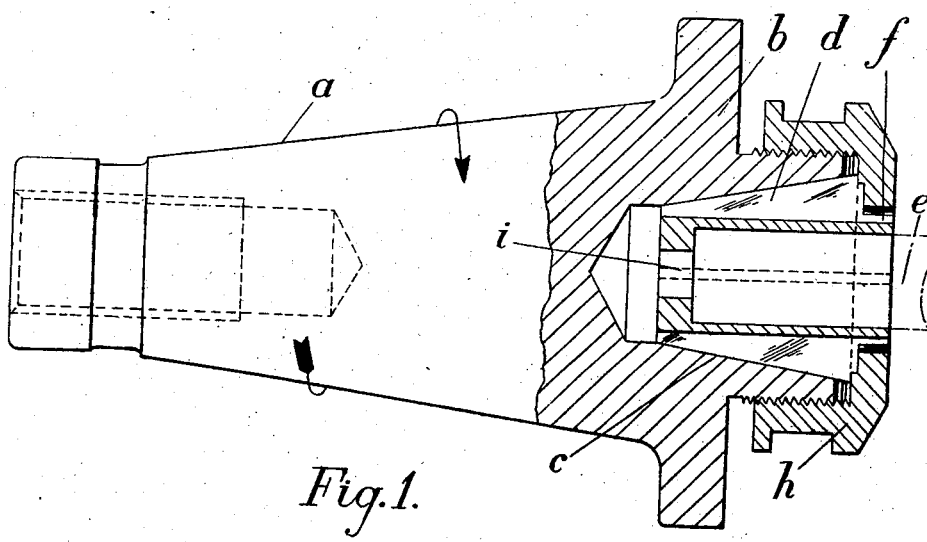
Fig.1.
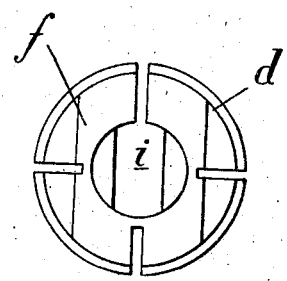
Fig.2.
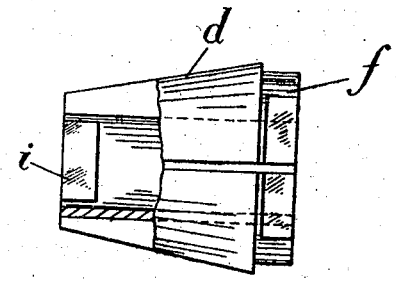
Fig.3.
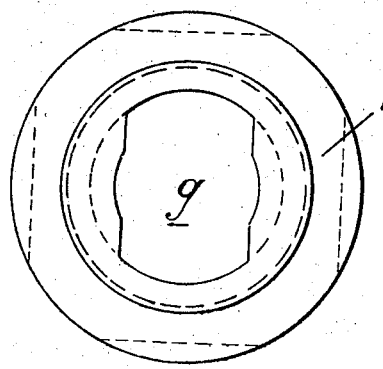
Fig.4.
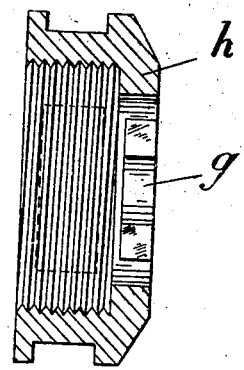
Fig.5. Inventor
C. H. Clare
By Glascock Downing Sebald
Attys Patented Aug. 7, 1945

2,381,335

UNITED STATES PATENT OFFICE 2,381,335

CHUCK FOR DRILLS, REAMERS, MILLING CUTTERS, AND LIKE TOOLS

Charles Henry Clare, Salford, England, assignor to Clare-Collets Limited, Salford, England, a British company Application May 19, 1943, Serial No. 487,626
In Great Britain May 13, 1942

1 Claim. (Cl. 279—52)

This invention relates to chucks for milling cutters, drills, reamers, and like tools having parallel shanks, particularly milling cutters, and has for its object to provide an improved chuck of simple and economical construction, which gives true running of the tool and can be used with tools having tanged or plain shanks or the type of shank described and claimed in prior British Patent No. 319,130.

A chuck in accordance with this invention comprises a shank with an internally coned body which receives the conical split collet, into which the tool shank is placed for gripping purposes, the outer or large end of the collet being of non-circular shape and fitting in a similar non-circular hole in the coupling secured to the shank body.

Referring to the accompanying sheet of explanatory drawings—

Figure 1 is a sectional elevation of a chuck constructed in one convenient form in accordance with this invention.

Figures 2 and 3 are end and side elevations respectively of the collet part of the chuck shown in Figure 1.

Figures 4 and 5 are end elevation and sectional side elevation respectively of the coupling part of the chuck shown in Figure 1.

The chuck comprises a shank $a$ incorporating a body $b$ which is internally coned at $c$ to receive the conical split collet $d$ into which the tool shank $e$ is placed for gripping purposes. The outer or large end $f$ of the collet is made non-circular in shape so that it can fit in a similar non-circular hole $g$ in the coupling $h$ by which the collet is secured in the shank body. The coupling $h$ is shown screwed upon the shank body with a right hand thread and it constitutes a positive driving means for the collet from such body, for turning of the shank body in the direction of the arrow in Figure 1 will, due to the resistance of the tool and the positive connection between the coupling and body, result in screwing the coupling $h$ further on to the body, thus tightening the collet upon the tool.

The collet has a rectangular hole $i$ at its inner small diameter end to receive the tangs of the tools which are provided therewith and when used in conjunction with a tanged type of cutter, the chuck becomes self tightening on the cutter shank when in service. Tanged types of tools may also have undercut portions to form shoulders which come beyond the rectangular hole for preventing axial movement of the tool when in use as described in the specification of the patent previously referred to. The collet will drive tools which have no tangs.

The term non-circular is intended to cover any shape which will prevent relative movement between the collet and coupling. It may be a circular shape with a key and keyway.

It will be appreciated that my improved chuck is simple in construction and can be more economically produced than comparable chucks for the same purpose.

What I claim is:

A chuck for a milling cutter or like tool comprising a shank having a body formed with a substantially conical recess, a conical tool receiving collet inserted in said recess and having a slit extending from end to end thereof, a coupling threaded on said body and having a flat-sided hole therein, the outer end of the collet having a shape corresponding with and fitting in said hole, the drive from the body to the tool and the resistance of the latter tending to screw the coupling upon the body and so tighten the engagement of the collet with the tool.

CHARLES HENRY CLARE.